(12) United States Patent
Watanabe et al.

(10) Patent No.: US 11,460,110 B2
(45) Date of Patent: Oct. 4, 2022

(54) SEALING DEVICE (71) Applicant: NOK CORPORATION, Tokyo (JP)

(72) Inventors: Toshiki Watanabe, Fukushima (JP); Kokichi Hamamoto, Fukushima (JP); Tomoaki Nishimura, Fukushima (JP); Hiromi Sugihara, Fukushima (JP)

(73) Assignee: NOK CORPORATION, Tokyo (JP)

( * ) Notice: Subject to any disclaimer, the term of this patent is extended or adjusted under 35 U.S.C. 154(b) by 63 days.

(21) Appl. No.: 16/966,595

(22) PCT Filed: Apr. 2, 2019

(86) PCT No.: PCT/JP2019/014652
§ 371 (c)(1),
(2) Date: Jul. 31, 2020

(87) PCT Pub. No.: WO2019/194185
PCT Pub. Date: Oct. 10, 2019

(65) Prior Publication Data
US 2021/0080007 A1 Mar. 18, 2021

(30) Foreign Application Priority Data

Apr. 6, 2018 (JP) .............................. JP2018-074190

(51) Int. Cl.
*F16J 15/3232* (2016.01)
*F16J 15/3284* (2016.01)

(52) U.S. Cl.
CPC ....... *F16J 15/3232* (2013.01); *F16J 15/3284* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 5,201,529 A * 4/1993 Heinzen ............... F16J 15/3256
277/351
6,892,587 B2 * 5/2005 Mizutani ................. F16C 33/78
73/862.193
(Continued)

FOREIGN PATENT DOCUMENTS

CN 101600896 12/2009
CN 203189533 9/2013
(Continued)

OTHER PUBLICATIONS

China Office Action issued in CN application No. 201980006576.X, dated Sep. 3, 2021 and English translation thereof.
(Continued)

*Primary Examiner* — Nathan Cumar
(74) *Attorney, Agent, or Firm* — Greenblum & Bernstein, P.L.C.

(57) ABSTRACT

A sealing device includes a reinforcing ring and an elastic body part. The elastic body part includes an annular seal lip, an annular dust lip, and an annular side lip that extends toward an outer side on an outer periphery side of the dust lip. The side lip includes an annular middle portion that increases in diameter as progress toward the outer side and an annular distal end portion that is a portion connected to and on the outer side of the middle portion and that increases in diameter as progress toward the outer side. In the side lip, the distal end portion is bent to an inner periphery side from the middle portion. In the middle portion, at least one groove is formed annularly around an axis x.

11 Claims, 10 Drawing Sheets (58) Field of Classification Search
CPC ...... F16J 15/3232; F16J 15/3236; F16J 15/54; F16J 15/56; F16J 15/3284
USPC .......................................................... 277/568
See application file for complete search history.

(56) References Cited

U.S. PATENT DOCUMENTS

| | | | | |
|---|---|---|---|---|
| 7,021,830 | B2* | 4/2006 | Takehara | ............ F16C 33/7823 384/486 |
| 7,066,471 | B2 | 6/2006 | Mause et al. | |
| 8,770,848 | B2* | 7/2014 | Koma | ..................... F16C 19/52 384/484 |
| 9,958,012 | B2* | 5/2018 | Nakata | ................. F16J 15/3256 |
| 2006/0091614 | A1 | 5/2006 | Oricchio, Jr. | |
| 2007/0201782 | A1* | 8/2007 | Miyagawa | .......... B60B 27/0094 384/486 |
| 2010/0066030 | A1 | 3/2010 | Kobayashi | |
| 2018/0209546 | A1 | 7/2018 | Nagahamaya et al. | |

FOREIGN PATENT DOCUMENTS

| | | | | |
|---|---|---|---|---|
| EP | 1475548 | | 11/2004 | |
| JP | S63-14067 | U | 1/1988 | |
| JP | 2004-263797 | A | 9/2004 | |
| JP | 2005-264999 | | 9/2005 | |
| JP | 2005-325924 | | 11/2005 | |
| JP | 2016-151337 | A | 8/2016 | |
| WO | 2017/051920 | A1 | 3/2017 | |
| WO | WO-2017051920 | A1 * | 3/2017 | ........... F16J 15/3204 |

OTHER PUBLICATIONS

Notice of Reasons for Refusal received in corresponding JP application No. 2020-512263, dated May 10, 2021, and English language translation thereof.
International Search Report issued in Patent Application No. PCT/JP2019/014652, dated Jul. 2, 2019 and English translation thereof.
International Preliminary Report on Patentability/Written Opinion of the International Searching Authority issued in Patent Application No. PCT/JP2019/014652, dated Oct. 6, 2020 and English translation thereof.
Extended European Search Report issued in European Patent Application No. 19781611.9, dated Dec. 3, 2021.
Office Action issued in Indonesia Patent Application No. P00202005015, dated Jul. 5, 2022, together with an English translation thereof.

* cited by examiner

FIG.10

SEALING DEVICE

TECHNICAL FIELD

The present invention relates to a sealing device, and particularly relates to a sealing device used for a rotating shaft.

BACKGROUND ART

Conventionally, sealing devices are used to seal a gap between a rotating shaft and a through-hole into which the shaft is inserted. Some of such sealing devices are used for mechanisms such as differential mechanisms and hub bearings in vehicles that are exposed to foreign matter such as muddy water, rainwater, and dust. Some of such sealing devices have a side lip formed so as to extend to an open-air side to prevent entry of foreign matter. The side lip is in contact with a member such as a deflector extending radially from a shaft and thereby prevents foreign matter from entering the inside from the open-air side.

Figure 9:
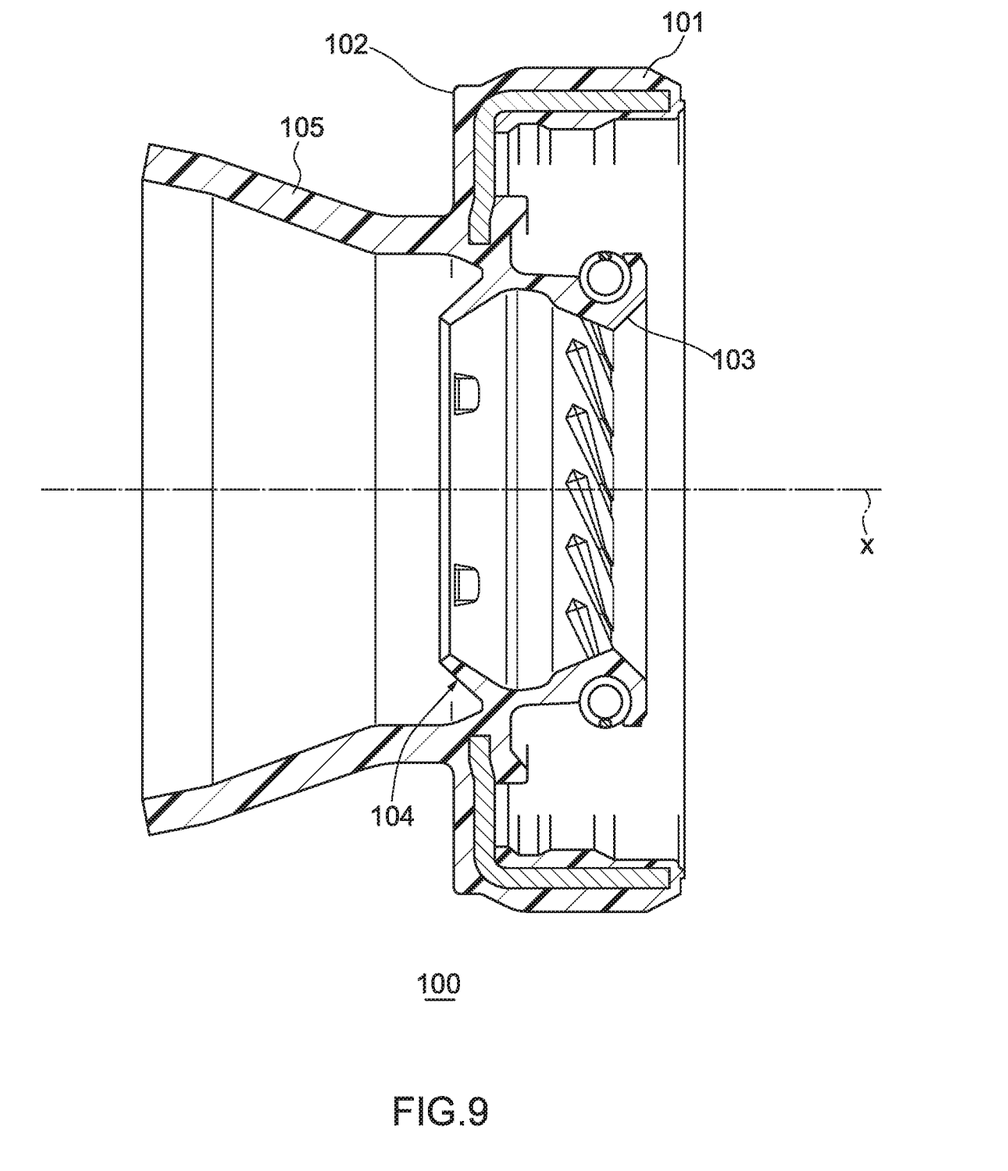
Figure 10:
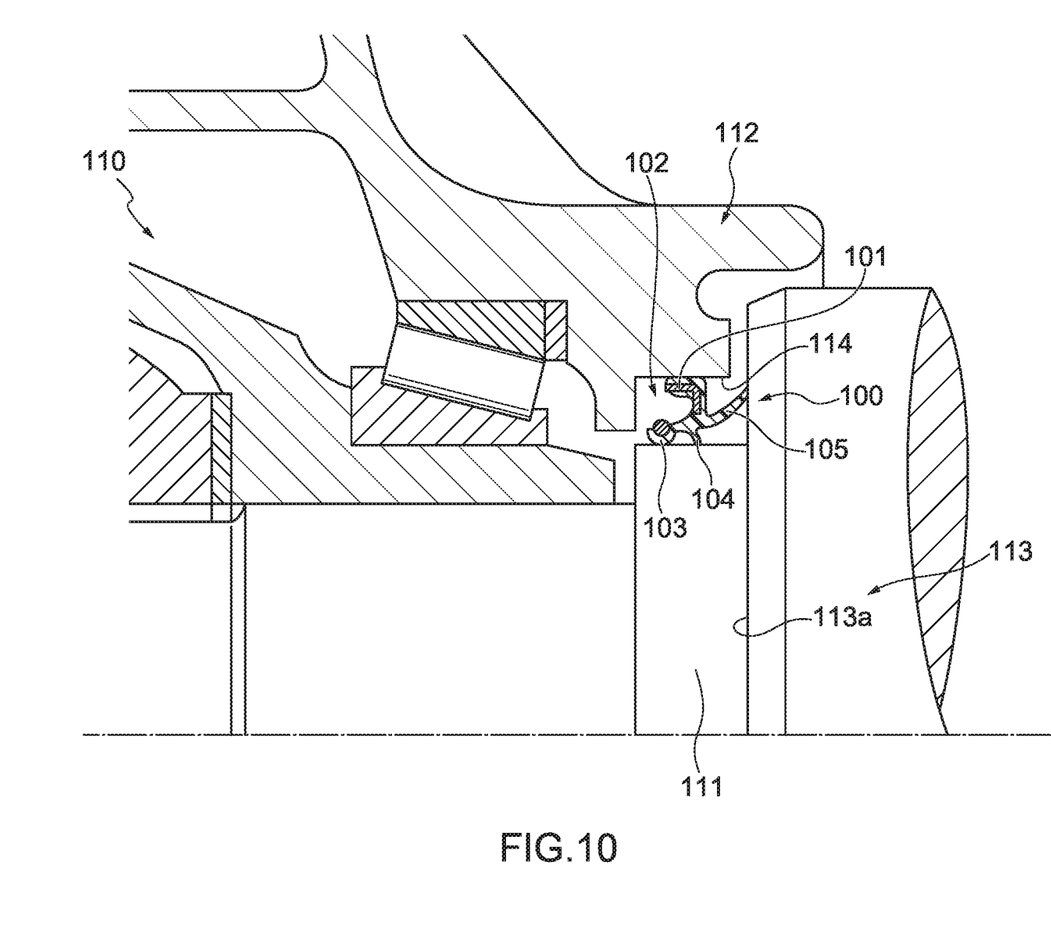

FIG. 9 is a cross-sectional view for illustrating a schematic configuration of a conventional sealing device 100 that is used, for example, for a differential mechanism. FIG. 10 is a cross-sectional view of the conventional sealing device illustrated in FIG. 9 in a state of being attached to a differential mechanism provided in a transaxle, for example. As illustrated in FIG. 9, the conventional sealing device 100 includes an annular reinforcing ring 101 and an annular elastic body part 102 formed from an elastic body that is integrally formed with the reinforcing ring 101, and the elastic body part 102 includes a seal lip 103, a dust lip 104, and a side lip 105. As illustrated in FIG. 10, the seal lip 103 in a usage state is in contact with an axle 111 of a differential mechanism 110 to thereby prevent lubricant in a housing 112 in which the differential mechanism 110 is housed from leaking out. The dust lip 104 is formed outside (at the open-air side of) the seal lip 103, and is in contact with or adjacent to the axle 111 to thereby prevent foreign matter from entering into the housing 112 from the outer side. As illustrated in FIG. 9, the side lip 105 extends toward the outer side on an outer periphery side of the dust lip 104, and has a conical cylindrical shape that increases in diameter as progress toward an outer side. The shape of the side lip 105 is such that a distal end portion of the side lip 105 is bent inwardly. As illustrated in FIG. 10, the side lip 105 in the usage state prevents foreign matter from entering from the outer side, with a distal end edge of the side lip 105 being in contact with a sliding surface 113a of an annular deflector 113 fixed to the axle 111. The side lip 105 is elastically deformed and curved in a state of being in contact with the deflector 113, and an inner peripheral surface of the distal end edge is formed so as to be in contact with the sliding surface 113a of the deflector 113.

The sealing device 100 is attached between a through-hole 114 in the housing 112 in which the differential mechanism 110 is housed and the axle 111 inserted through the through-hole 114 in order to seal the through-hole 114, thereby preventing the lubricant stored in the housing 112 from leaking out to the outer side, and preventing the foreign matter from entering into the housing 112 (for example, see Patent Literature 1).

DOCUMENT LIST

Patent Literature

Patent Literature 1: International Publication No. WO 2017/051920

SUMMARY OF INVENTION

Technical Problem

In the conventional sealing device 100, as described above, the distal end portion of the side lip 105 is bent. This prevents a contact pressure on the deflector 113 at a distal end of the side lip 105 in the usage state from decreasing and prevents the distal end of the side lip 105 from floating away from the sliding surface 113a of the deflector 113. This configuration prevents foreign matter from entering the inner side. In this way, the conventional sealing device 100 has high performance in preventing the entry of foreign matter. However, due to a need for further improved fuel efficiency and the like in recent years and a need for a further improvement in durability of the side lip 105, there has been a demand for a reduction in sliding torque caused by a sliding movement of the side lip 105.

In view of the challenge described above, it is an object of the present invention to provide a sealing device capable of reducing sliding torque caused by a side lip.

Solution to Problem

A sealing device according to the present invention, accomplished to attain the object described above, is for sealing between a through-hole and a shaft inserted through the through-hole, characterized in that the sealing device includes: a reinforcing ring formed annularly around an axis; and an elastic body part formed from an elastic body that is attached to the reinforcing ring and that is formed annularly around the axis, the elastic body part including: an annular seal lip, the seal lip being in contact with the shaft such that the shaft is slidable; an annular dust lip, the dust lip being provided on an outer side of the seal lip and extending toward the axis; and an annular side lip, the side lip extending toward the outer side on an outer periphery side of the dust lip, the side lip having: an annular middle portion, the middle portion increasing in diameter as progress toward the outer side in a direction of the axis; and an annular distal end portion, the distal end portion being a portion connected to and on the outer side of the middle portion, the distal end portion increasing in diameter as progress toward the outer side in the direction of the axis, wherein in the side lip, the distal end portion is bent to an inner periphery side from the middle portion, and wherein in the middle portion, at least one groove is formed annularly around the axis.

In the sealing device according to one aspect of the present invention, the distal end portion of the side lip is formed so as to decrease in thickness as progress toward the middle portion side.

In the sealing device according to one aspect of the present invention, the groove is formed in an inner peripheral surface of the middle portion.

In the sealing device according to one aspect of the present invention, a cross section of the groove along the axis has an outline of an arc having a fixed curvature.

In the sealing device according to one aspect of the present invention, the groove is not formed in a connection zone between the distal end portion and the middle portion.

In the sealing device according to one aspect of the present invention, a plurality of the grooves are formed, and a space between the grooves adjacent to each other is constant.

A sealing device according to the present invention, accomplished to attain the object described above, is for sealing between a through-hole and a shaft inserted through the through-hole, characterized in that the sealing device includes: a reinforcing ring formed annularly around an axis; and an elastic body part formed from an elastic body that is attached to the reinforcing ring and that is formed annularly around the axis, the elastic body part including: an annular seal lip, the seal lip being in contact with the shaft such that the shaft is slidable; an annular dust lip, the dust lip being provided on an outer side of the seal lip and extending toward the axis; and an annular side lip, the side lip extending toward the outer side on an outer periphery side of the dust lip, the side lip having: an annular middle portion, the middle portion increasing in diameter as progress toward the outer side in a direction of the axis; and an annular distal end portion, the distal end portion being a portion connected to and on the outer side of the middle portion, the distal end portion increasing in diameter as progress toward the outer side in the direction of the axis, wherein in the side lip, the distal end portion is bent to an inner periphery side from the middle portion, and wherein the distal end portion of the side lip is formed so as to decrease in thickness as progress toward the middle portion side.

In the sealing device according to one aspect of the present invention, the middle portion is formed so as to have a fixed thickness.

In the sealing device according to one aspect of the present invention, the distal end portion has a conical cylindrical shape centered about the axis, and the middle portion has a conical cylindrical shape centered about the axis.

In the sealing device according to one aspect of the present invention, the side lip has a root portion formed annularly around the axis, and the middle portion is a portion that is connected to the root portion and that is on the outer side of the root portion.

Effects of Invention

The sealing device according to the present invention is capable of reducing sliding torque caused by the side lip.

DESCRIPTION OF EMBODIMENTS

Hereinafter, embodiments of the present invention will be described with reference to the drawings.

Figure 1:
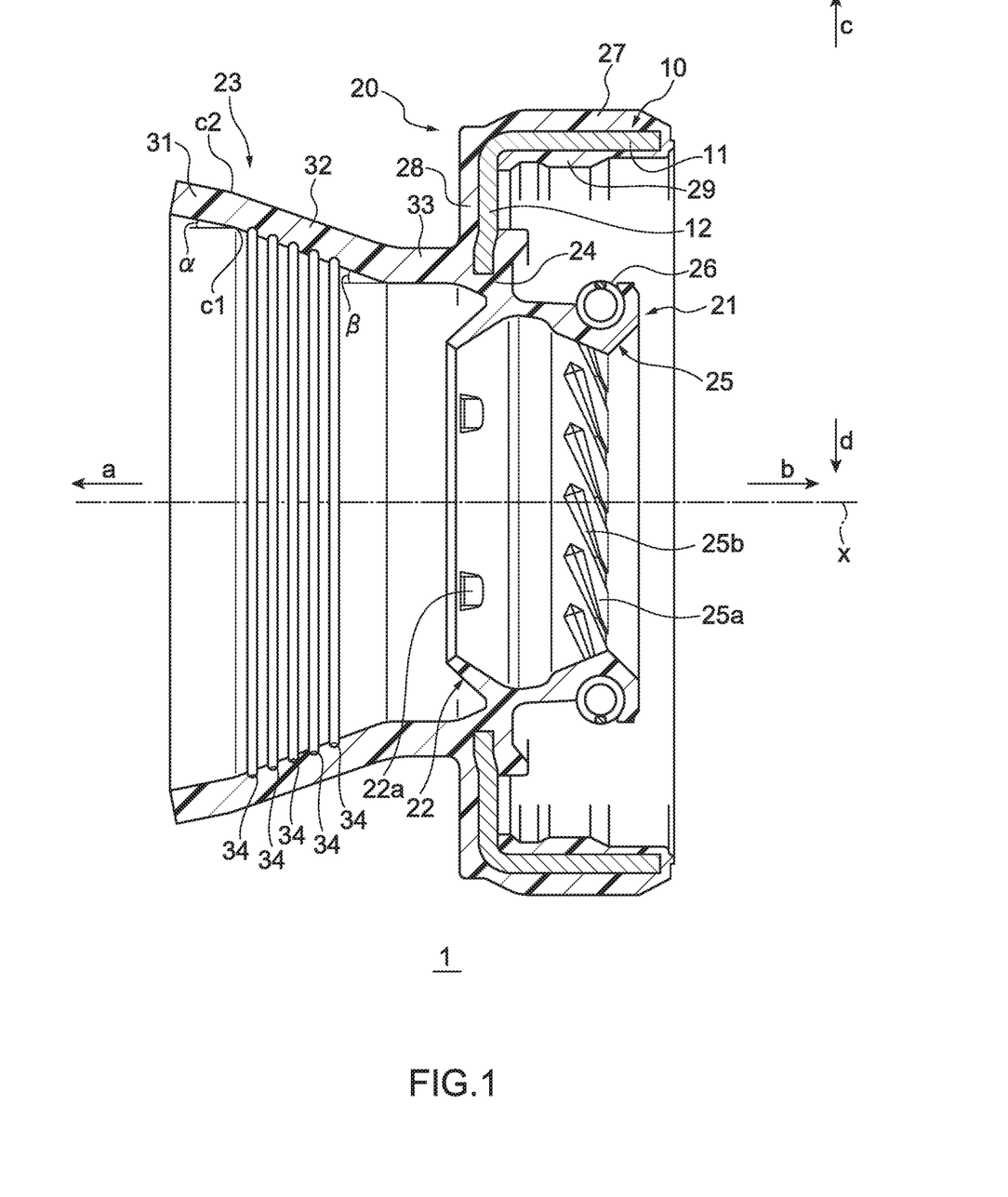
FIG. 1 A cross-sectional view taken along an axis for illustrating a schematic configuration of a sealing device according to a first embodiment of the present invention FIG. 2 A partial enlarged cross-sectional view of the sealing device illustrated in FIG. 1
Figure 2:
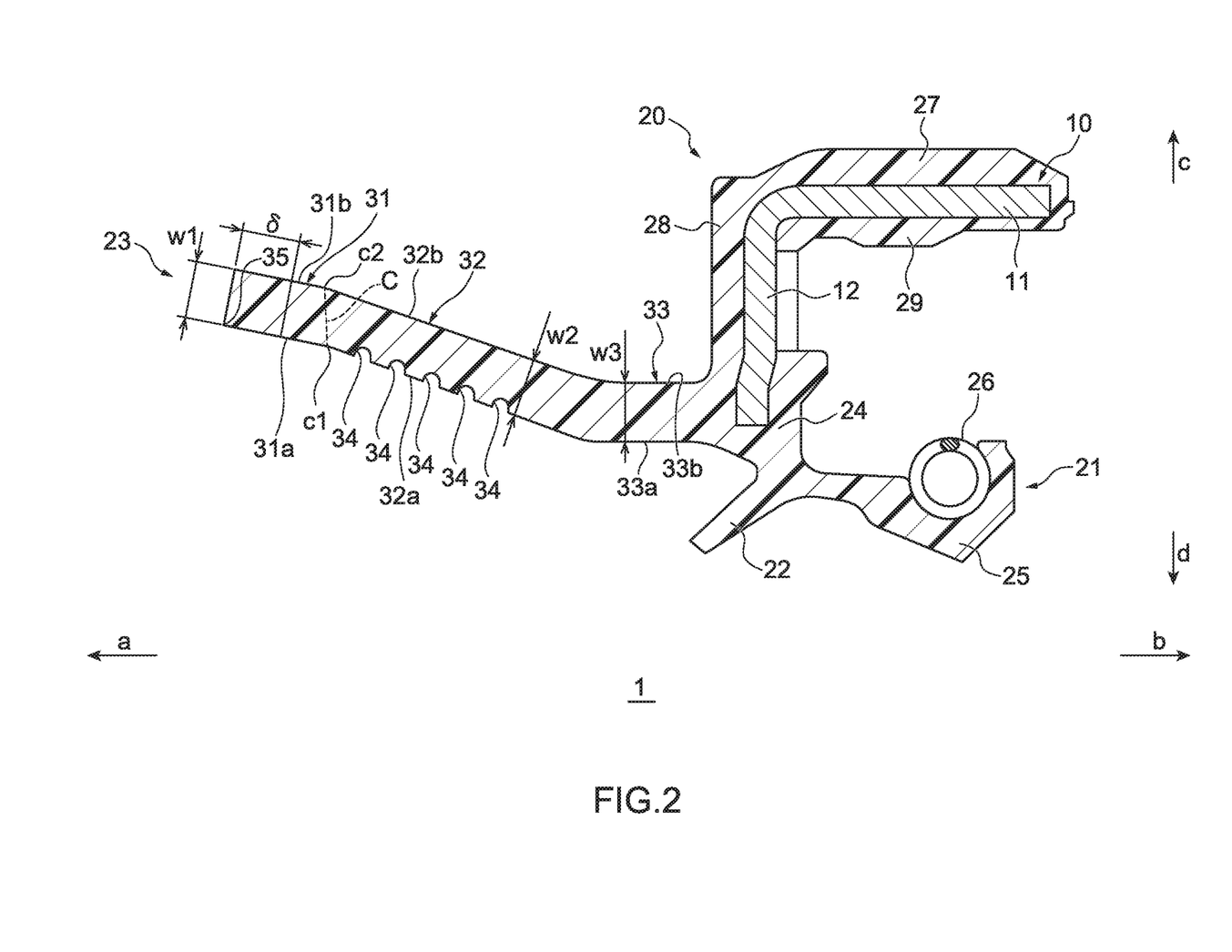

FIG. 1 is a cross-sectional view taken along an axis x for illustrating a schematic configuration of a sealing device 1 according to a first embodiment of the present invention. FIG. 2 is a partial enlarged cross-sectional view of the sealing device 1 illustrated in FIG. 1. The sealing device 1 according to the first embodiment of the present invention is used to seal a gap between a through-hole and a shaft inserted through the through-hole, in which the through-hole and the shaft rotate relative to each other. The sealing device 1 is used, for example, for a device provided with a differential mechanism for absorbing a difference in rotational speed between right and left driving wheels during turning of a vehicle, a general purpose machine, or the like. Examples of the device provided with the differential mechanism include transaxles and differential devices. In the present embodiment, the sealing device 1 is used for a transaxle. Specifically, in the transaxle, the sealing device 1 is used for sealing between a through-hole formed in a housing and an axle as an output shaft of the differential mechanism that is rotatably inserted through the through-hole, as described later. A component to which the sealing device 1 is applied is not limited to this specific example. The sealing device can be applied to other rotating members in various machines.

Hereinafter, a direction directed by an arrow a in a direction of the axis x (see FIG. 1) represents an outer side, and a direction directed by an arrow b in the direction of the axis x (see FIG. 1) represents an inner side, for convenience of explanation. The outer side means a side facing the outside of a component to which the sealing device is applied, and the inner side means a side facing the inside of the component to which the sealing device is applied. More specifically, the outer side means a side facing the outside of the housing in the transaxle provided with a differential mechanism, and an atmosphere side, and the inner side means a side facing the inside of the housing in the transaxle. In a direction perpendicular to the axis x (hereinafter also referred to as a "radial direction"), a direction away from the axis x (a direction directed by an arrow c in FIG. 1) represents an outer periphery side, and a direction approaching the axis x (a direction directed by an arrow d in FIG. 1) represents an inner periphery side.

The sealing device 1 includes a reinforcing ring 10 formed annularly around the axis x and an elastic body part 20 formed from an elastic body that is attached to the reinforcing ring 10 and that is formed annularly around the axis x. The elastic body part 20 includes an annular seal lip 21 that is put into contact with a shaft of the component to which the sealing device is applied, such that the shaft is slidable, as described later, an annular dust lip 22 that is provided on the outer side (an arrow a direction side) of the seal lip 21 and that extends toward the axis x, and an annular side lip 23 that extends toward the outer side on the outer periphery side (an arrow c direction side) of the dust lip 22. The side lip 23 has an annular middle portion 32 that increases in diameter as progress toward the outer side in the direction of the axis x and an annular distal end portion 31 that is a portion connected to and on the outer side of the middle portion 32 and that increases in diameter as progress toward the outer side in the direction of the axis x. In the side lip 23, the distal end portion 31 is bent to the inner periphery side (an arrow d direction side) from the middle portion 32. In the middle portion 32, at least one groove 34 is formed annularly around the axis x. Hereinafter, a structure of the sealing device 1 will be described in detail.

As illustrated in FIGS. 1 and 2, the reinforcing ring 10 is an annular member centered about or substantially centered about the axis x and is made of metal. A shape of a cross section along the axis x (hereinafter simply referred to as a "cross section") of the reinforcing ring 10 is an L shape or a substantially L shape. The reinforcing ring 10, for example, includes a cylindrical part 11 that is a cylindrical or substantially cylindrical portion extending in the direction of the axis x, and a disc 12 that is a hollow disc-shaped portion extending toward the inner periphery side from an outer end portion of the cylindrical part 11. The cylindrical part 11 is formed such that the sealing device 1 is allowed to be fitted to an inner peripheral surface of the through-hole formed in the housing of the transaxle, as described later. The cylindrical part 11 may be directly in contact with the inner peripheral surface of the through-hole to be able to be fitted to the inner peripheral surface of the through-hole, or may be in contact with the inner peripheral surface of the through-hole through a portion of the elastic body part 20 to be able to be fitted to the inner peripheral surface of the through-hole.

As illustrated in FIGS. 1 and 2, the elastic body part 20 is attached to the reinforcing ring 10, and is integrally formed with the reinforcing ring 10 to cover the entire reinforcing ring 10 in the present embodiment. The elastic body part 20, as described above, includes the seal lip 21, the dust lip 22, and the side lip 23 and also includes an annular lip waist portion 24. The seal lip 21 is formed so as to be in contact with an axle of the differential mechanism so that the axle is slidable, as described later, and the dust lip 22 is provided on the outer side of the seal lip 21 and formed so as to be in contact with the axle so that the axle is slidable. The side lip 23 is formed so as to be in contact with an annular deflector fixed to the axle so that the deflector is slidable, and extends toward the outer side on the outer periphery side of the dust lip 22 as described later. In the elastic body part 20, the lip waist portion 24 is a portion positioned in the vicinity of an end portion on the inner periphery side of the disc 12 of the reinforcing ring 10.

Specifically, the seal lip 21 is a portion that extends toward the inner side from the lip waist portion 24, and an annular portion centered about or substantially centered about the axis x, and is formed by facing the cylindrical part 11 of the reinforcing ring 10, as illustrated in FIGS. 1 and 2.

The seal lip 21 has an annular lip distal end portion 25 at an inner end portion, the lip distal end portion 25 having a cross section formed in a wedge shape projecting toward the inner periphery side. A garter spring 26 is fitted at a position facing away from the lip distal end portion 25 on the outer periphery side of the seal lip 21. The garter spring 26 presses the lip distal end portion 25 in a direction toward the axis x to apply a tensional force of a predetermined magnitude to the lip distal end portion 25 against the axle such that the lip distal end portion 25 follows a displacement of the axle. The lip distal end portion 25 is in contact with an outer peripheral surface of the axle to seal between the sealing device 1 and the axle, as described later. As illustrated in FIG. 1, a plurality of screw projections 25*b* are formed at equal angle intervals in a circumferential direction on a taper surface 25*a* of a conical surface shape of the lip distal end portion 25 on the outer side, the screw projections 25*b* extending diagonally with respect to a distal end of the lip distal end portion 25 and projecting to the inner periphery side. The screw projections 25*b* generate air flow from the outside to the inner side when the axle is slid, to thereby prevent lubricant from leaking from the inside. The elastic body part 20 may not be provided with the screw projections 25*b*.

The dust lip 22 extends outwardly from the lip waist portion 24 and toward the axis x, more particularly, as illustrated in FIGS. 1, 2, the dust lip 22 extends in a direction toward the outer side and the inner periphery side from the lip waist portion 24. The dust lip 22 prevents foreign matter such as muddy water, sand, and dust from entering in a direction from the outer side toward the lip distal end portion 25. In the dust lip 22, in order that a negative pressure is not generated in a space between the dust lip 22 and the seal lip 21 in the usage state, a plurality of projections 22*a* projecting in the inner peripheral direction are formed at equal angle intervals in a circumferential direction so that a gap is formed by partially releasing the contact between the dust lip 22 and the axle to thereby suppress the generation of the negative pressure or eliminate the negative pressure. The dust lip 22 may be adjacent to the axle without being in contact with the axle, or may not have the projections 22*a*.

The elastic body part 20 includes a gasket part 27, a rear cover part 28, and a lining part 29. In the elastic body part 20, the gasket part 27 is a portion that covers the cylindrical part 11 of the reinforcing ring 10 from the outer periphery side. As described later, the thickness in the radial direction of the gasket part 27 is set so that, when, in the transaxle, the sealing device 1 is press-fitted into a through-hole through which the axle is inserted, the gasket part 27 is compressed between the through-hole and the cylindrical part 11 of the reinforcing ring 10 in the radial direction so that the gasket part 27 generates a fitting force of a predetermined magnitude in the radial direction. The rear cover part 28 is a portion that covers the disc 12 of the reinforcing ring 10 from the outer side. The lining part 29 is a portion that covers the reinforcing ring 10 from the inner side and the inner periphery side.

As illustrated in FIGS. 1, 2, the side lip 23 has the distal end portion 31, the middle portion 32, and a root portion 33. The root portion 33 is an annular portion extending in the direction of the axis x. The middle portion 32 is a portion that is connected to the root portion 33 and is on the outer side of the root portion 33. The distal end portion 31 is a portion that is connected to the middle portion 32 and is on the outer side of the middle portion 32. Specifically, in the elastic body part 20, the side lip 23 extends outwardly from an outer side portion of the lip waist portion 24, and the root portion 33 extends outwardly from the lip waist portion 24.

The middle portion 32 extends outwardly from an outer end portion of the root portion 33, and the distal end portion 31 extends outwardly from an outer end portion of the middle portion 32. Note that the side lip 23 may have no root portion 33, and the middle portion 32 may extend from the lip waist portion 24.

An inner peripheral surface 31a that is a surface on the inner periphery side of the distal end portion 31 and an inner peripheral surface 32a that is a surface on the inner periphery side of the middle portion 32 are connected at an inner peripheral connection portion c1 that forms an annular line. An outer peripheral surface 31b that is a surface on the outer periphery side of the distal end portion 31 and an outer peripheral surface 32b that is a surface on the outer periphery side of the middle portion 32 are connected at an outer peripheral connection portion c2 that forms an annular line. The inner peripheral surface 31a of the distal end portion 31 and the inner peripheral surface 32a of the middle portion 32 may be smoothly connected to each other. Similarly, the outer peripheral surface 31b of the distal end portion 31 and the outer peripheral surface 32b of the middle portion 32 may be smoothly connected to each other.

Specifically, the distal end portion 31 has a conical cylindrical or substantially conical cylindrical shape centered or substantially centered about the axis x. The middle portion 32 has a conical cylindrical or substantially conical cylindrical shape centered or substantially centered about the axis x, and the root portion 33 has a cylindrical or substantially cylindrical shape centered or substantially centered about the axis x. The root portion 33 may have a conical cylindrical or substantially conical cylindrical shape. As described above, the distal end portion 31 is bent to the inner periphery side from the middle portion 32 such that an angle (angle α) between a generating line of the inner peripheral surface 31a or the outer peripheral surface 31b of the distal end portion 31 and the axis x is smaller than an angle (angle β) between a generating line of the inner peripheral surface 32a or the outer peripheral surface 32b of the middle portion 32 and the axis x (see FIG. 1).

As illustrated in FIG. 2, a thickness w1 of the distal end portion 31, i.e., a width between the inner peripheral surface 31a and the outer peripheral surface 31b of the distal end portion 31, is a fixed thickness or a substantially fixed thickness, and a thickness w2 of the middle portion 32, i.e., a width between the inner peripheral surface 32a and the outer peripheral surface 32b of the middle portion 32, is a fixed thickness or a substantially fixed thickness. As illustrated in FIG. 2, a thickness w3 of the root portion 33, i.e., a width between the inner peripheral surface 33a and the outer peripheral surface 33b of the root portion 33, is a fixed thickness or a substantially fixed thickness.

As illustrated in FIG. 2, in a connection zone C that is a zone of connection between the distal end portion 31 and the middle portion 32, the inner peripheral connection portion c1 of the inner peripheral surfaces 31a, 32a is positioned on the inner side of the outer peripheral connection portion c2 of the outer peripheral surfaces 31b, 32b in the direction of the axis x. In other words, in the distal end portion 31, the inner peripheral surface 31a is longer than the outer peripheral surface 31b in the direction of the axis x. However, a form of the connection zone C is not limited to this example. The connection zone C may be formed such that the inner peripheral connection portion c1 and the outer peripheral connection portion c2 are positioned at identical or substantially identical positions in the direction of the axis x, for example.

As described above, in the middle portion 32 of the side lip 23, at least one groove 34 is formed annularly around the axis x. The groove 34 is formed in the inner peripheral surface 32a of the middle portion 32 and is recessed from the inner peripheral surface 32a. In the present embodiment, a plurality of grooves 34 are formed. For example, as illustrated in FIGS. 1 and 2, five grooves 34 are formed. Specifically, the grooves 34 each extend in the shape of a circle or substantially circle centered or substantially centered about the axis x. The grooves 34 are mutually concentric or substantially concentric circles. As illustrated in FIG. 2, a cross section of each of the grooves 34 along the axis x has an outline of an arc having a fixed curvature. The outline of the cross section of the groove 34 is a semicircle, for example. The outline of the cross section of the groove 34 may not be a semicircle but may be, for example, an arc smaller than the semicircle. The outline of the cross section of the groove 34 may be, for example, a combination of a curved line and a straight line, other than the arc having the fixed curvature. It is preferable that the outline of the cross section of each of the grooves 34 is a shape that facilitates warping of the side lip 23 to the outer periphery side, as described later.

A space between the grooves 34 adjacent to each other is constant or substantially constant and more particularly, in the middle portion 32 of the side lip 23, the grooves 34 are arranged at equal or substantially equal intervals along the inner peripheral surface 32a of the middle portion 32. No groove 34 is formed in the connection zone C between the distal end portion 31 and the middle portion 32. In other words, no groove 34 is formed in the inner peripheral connection portion c1 between the distal end portion 31 and the middle portion 32. The groove 34 positioned on the outer side of the middle portion 32 is formed inwardly apart from the inner peripheral connection portion c1.

In the side lip 23, as described above, the distal end portion 31 is bent to the inner periphery side from the middle portion 32. Thus, in the sealing device 1 in the usage state, as described later, the side lip 23 generates a contact pressure on the deflector at the distal end portion 31 with respect to a contact pressure on the deflector at the middle portion 32 such that the contact between a distal end 35 of the side lip 23 and the deflector is not released. In other words, when a position of contact of the side lip 23 with the deflector reaches the middle portion 32 beyond the distal end portion 31, the contact pressure at the distal end portion 31 of the side lip 23 on the deflector is made larger than the contact pressure at the middle portion 32 on the deflector to prevent the distal end 35 of the side lip 23 from floating away from the deflector.

As described above, the grooves 34 are formed in the middle portion 32 of the side lip 23, and this provides a reduction in rigidity (resistance) of the middle portion 32 to being warped (bent) to the outer periphery side. This allows the side lip 23, as compared with a side lip having no grooves 34, to reduce a pressure (pressing force) put on the deflector through a zone of contact of the distal end portion 31 with the deflector, or a reaction force put by the deflector through a zone of contact of the deflector with the distal end portion. This contributes to a reduction in sliding torque caused by the side lip 23. On the other hand, in the side lip 23, as described above, the distal end portion 31 is bent to the inner periphery side from the middle portion 32. This configuration allows the side lip 23 to keep the contact pressure on the deflector at the distal end portion 31 larger than the contact pressure on the deflector at the middle portion 32, prevent the distal end 35 of the side lip 23 from floating away from the deflector, and prevent foreign matter from entering the inside. Since the grooves 34 are provided in the middle portion 32, the side lip 23 makes an area of contact of the middle portion 32 with the deflector small and the contact pressure at the middle portion 32 large as compared with a side lip having no grooves 34. However, the distal end portion 31 is bent with respect to the middle portion 32 and hence in the side lip 23, the contact pressure at the distal end portion 31 is larger than the contact pressure at the middle portion 32. This enables the distal end portion 31 of the side lip 23 to be stably in contact with the deflector without floating away from the deflector.

In this way, the sealing device can reduce sliding torque caused by the side lip 23 while the side lip 23 is kept in a state of stable contact without letting the distal end portion 31 float away from the deflector.

Note that the elastic body part 20 is integrally formed of an elastic material, and the seal lip 21, the dust lip 22, the side lip 23, the lip waist portion 24, the gasket part 27, the rear cover part 28, and the lining part 29 are respective portions of the elastic body part 20 that is integrally formed of the elastic material.

The metal material for the reinforcing ring 10 is, for example, stainless steel or SPCC (a cold rolled steel sheet). Examples of the elastic body of the elastic body part 20 include various rubber materials. The various rubber materials are, for example, synthetic rubber such as nitrile rubber (NBR), hydrogenated nitrile rubber (H-NBR), acrylic rubber (ACM), and fluororubber (FKM). The reinforcing ring 10 is manufactured by press working or forging, for example, and the elastic body part 20 is molded with a mold by cross-linking (vulcanization). During the cross-linking, the reinforcing ring 10 is placed in the mold, the elastic body part 20 is bonded to the reinforcing ring 10 by cross-linking bonding, and the elastic body part 20 is integrally molded with the reinforcing ring 10.

Figure 3:
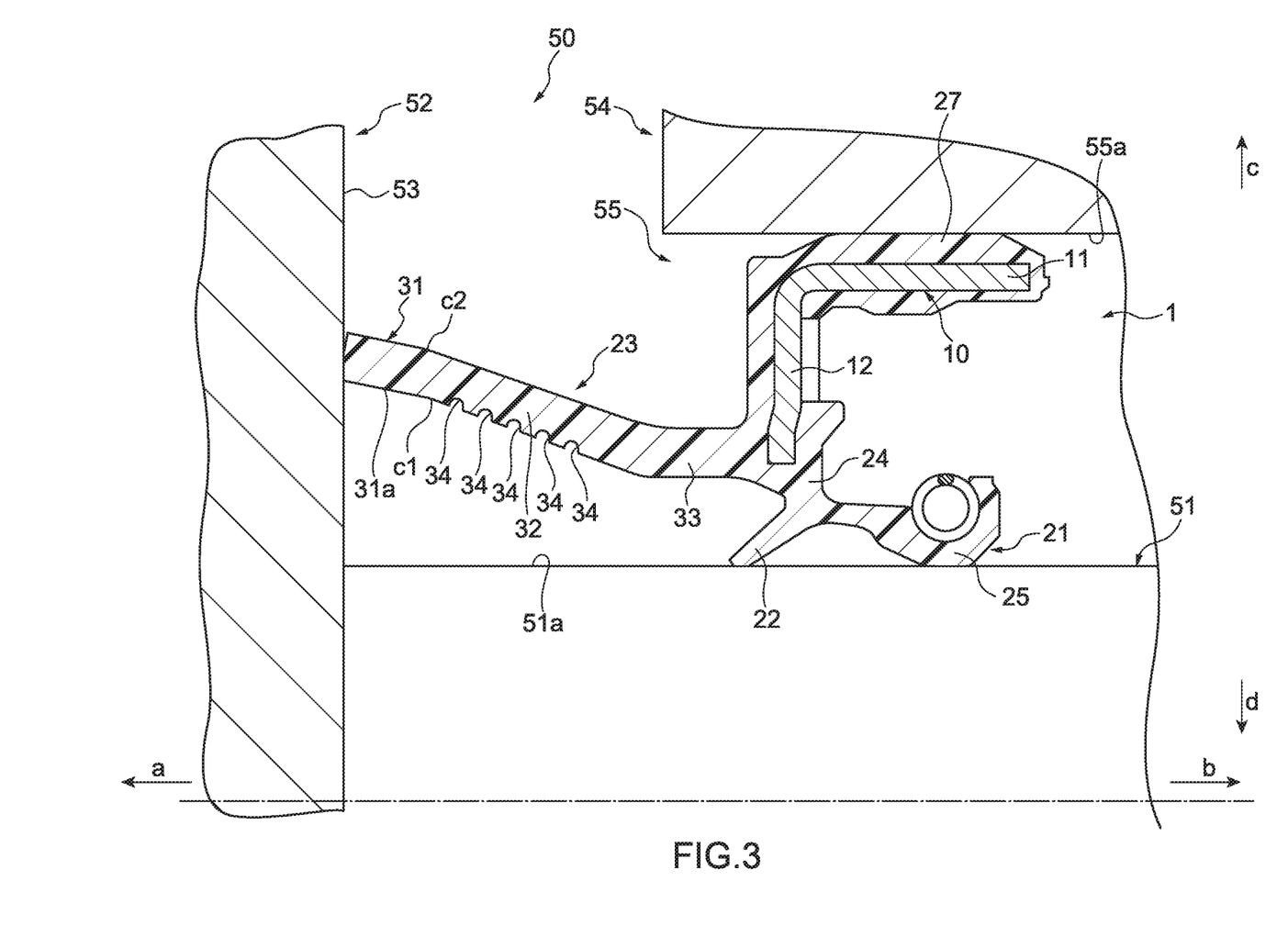
FIG. 3 A partial enlarged cross-sectional view taken along an axis x enlargedly illustrating the sealing device illustrated in FIG. 1 in a usage state and a vicinity of the sealing device FIG. 4 An enlarged cross-sectional view of a side lip for illustrating a state of the side lip in a state where the sealing device is attached to a desired position of a component to which the sealing device is applied FIG. 5 An enlarged cross-sectional view of the side lip for illustrating a state of the side lip in a state where a shaft portion of the component to which the sealing device is applied, is displaced FIG. 6 A partial enlarged cross-sectional view taken along an axis for illustrating a schematic configuration of a sealing device according to a second embodiment of the present invention FIG. 7 A partial enlarged cross-sectional view taken along an axis for illustrating a schematic configuration of a sealing device according to a third embodiment of the present invention FIG. 8 A partial enlarged cross-sectional view taken along an axis for illustrating a schematic configuration of a sealing device according to a modification example of any of the embodiments of the present invention FIG. 9 A cross-sectional view for illustrating a schematic configuration of a conventional sealing device that is used for a differential mechanism FIG. 10 A cross-sectional view for illustrating the conventional sealing device illustrated in FIG. 9 in a state of being attached to a differential mechanism provided in a transaxle

Next, operation of the sealing device 1 having the above-described configuration will be described. FIG. 3 is a view for illustrating the sealing device 1 in a state of being attached to a transaxle 50 that is an example of a component to which the sealing device is applied, and a partial enlarged cross-sectional view along the axis x enlargedly illustrating the vicinity of the sealing device 1 in the transaxle 50. Note that FIG. 3 illustrates a state where the sealing device 1 is attached to a desired position of the transaxle 50 (hereinafter referred to as an "initial state"). In other words, the sealing device 1 is attached to the transaxle 50 in such a manner that the distal end portion 31 of the side lip 23 is in contact with a sliding surface 53 of an annular deflector 52 by a desired contact width δ, the deflector 52 being fixed to an axle 51 as an output shaft of the differential mechanism (not illustrated) of the transaxle 50. The transaxle 50 is a well-known transaxle (see FIG. 9), and a detailed description of the configuration is omitted herein. Note that the deflector 52 may be formed of a member separate from the axle 51, or the deflector 52 may be formed by forming a part of the axle 51 to be annularly projected toward the outer periphery side.

As illustrated in FIG. 3, the sealing device 1 is fitted to a through-hole 55 formed in a housing 54 of the transaxle 50. The axle 51 is rotatably inserted through the through-hole 55. Note that the transaxle 50 is provided with two through-holes and two axles for right and left wheels, but the through-holes and the axles corresponding to respective wheels have similar configurations, respectively, and the through-hole 55 and the axle 51 correspond to each of the right and left wheels, respectively.

In the through-hole 55 in the housing 54, a space between an outer peripheral surface 51a of the axle 51 and an inner peripheral surface 55a of the through-hole 55 is sealed by the sealing device 1. Specifically, the sealing device 1 is fitted to the through-hole 55, the gasket part 27 of the elastic body part 20 is compressed between the cylindrical part 11 of the reinforcing ring 10 and the inner peripheral surface 55a of the through-hole 55 so that the gasket part 27 is in close contact with the inner peripheral surface 55a of the through-hole 55, thereby sealing between the sealing device 1 and the through-hole 55 on the outer periphery side. The lip distal end portion 25 of the seal lip 21 of the elastic body part 20 is in contact with the outer peripheral surface 51a of the axle 51 so that the axle 51 is slidable, thereby sealing between the sealing device 1 and the axle 51 on the inner periphery side. Thus, the lubricant stored in the housing 54 is prevented from leaking out to the outside.

A distal end edge of the dust lip 22 is in contact with the outer peripheral surface 51a of the axle 51 so that the axle 51 is slidable, thereby preventing foreign matter from entering into the housing 54 from the outside. The dust lip 22 may not be in contact with the axle 51. In the side lip 23, a distal end edge in the inner peripheral surface 31a in a range of the contact width δ of the distal end portion 31 is in contact with the sliding surface 53 of the deflector 52, thereby preventing the foreign matter from entering into the housing 54 from the outside.

Figure 4:
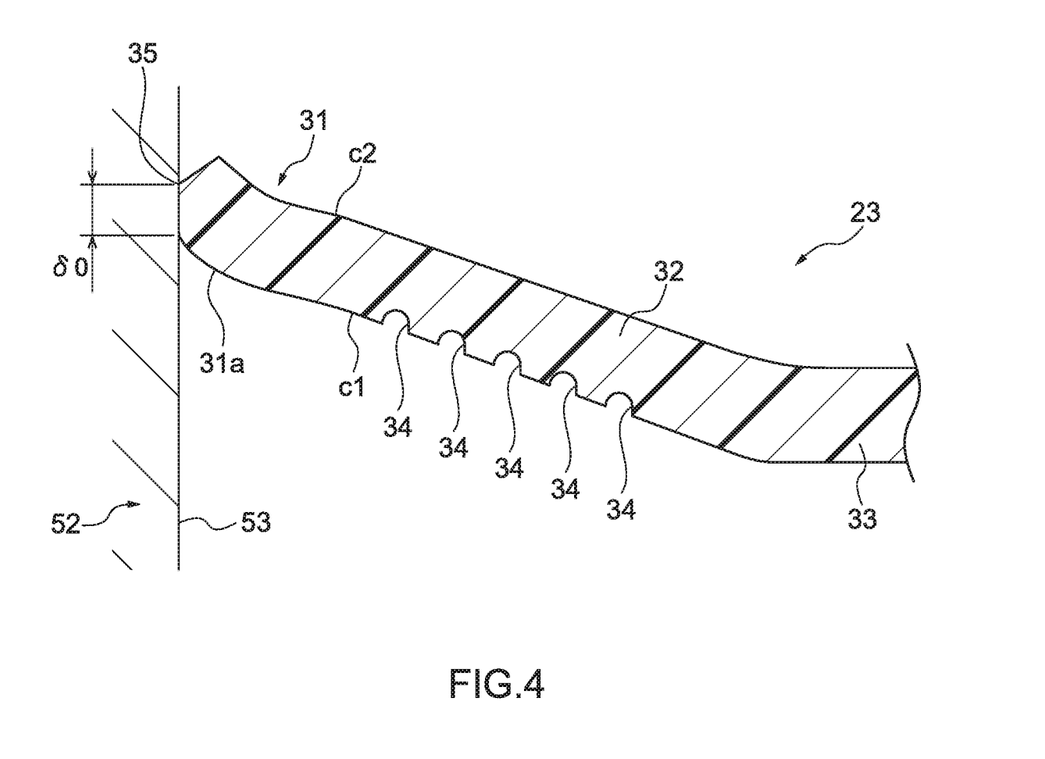

FIG. 4 is an enlarged cross-sectional view of the side lip 23 for illustrating a state of the side lip 23 in the initial state. As illustrated in FIG. 4, in the initial state, the distal end portion 31 of the side lip 23 is partially curved or is elastically deformed, and the inner peripheral surface 31a of the distal end portion 31 is in contact with the sliding surface 53 of the deflector 52 in a range of a contact width δ0 from the distal end 35.

Figure 5:
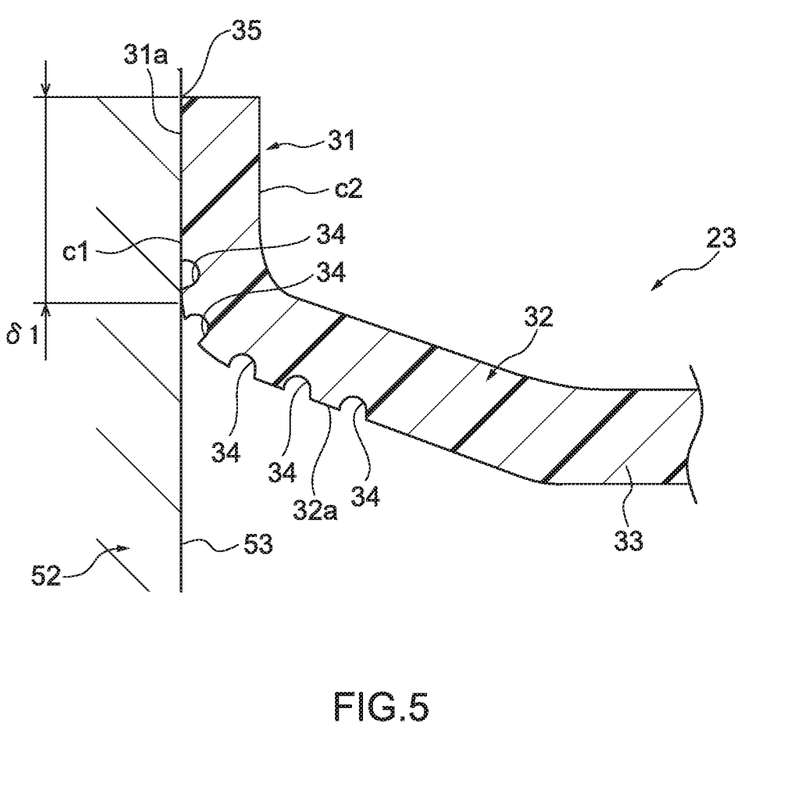

In the transaxle 50, the axle 51 may be displaced inwardly in the direction of the axis x so that the sliding surface 53 of the deflector 52 may be displaced in the direction of the axis x, or the axle 51 may be inclined with respect to the axis x so that the sliding surface 53 of the deflector 52 may be inclined, due to dimensional tolerance and assembly errors of each configuration. When the transaxle 50 is operated, the axle 51 may be displaced in the direction of the axis x or displaced diagonally with respect to the axis x based on the gap between respective configurations. If such a displacement (looseness) occurs, the width δ of contact of the side lip 23 with the deflector 52 is increased as illustrated in FIG. 5. In the side lip 23 in the sealing device 1, the distal end portion 31 is bent from the middle portion 32 toward the inner periphery side as described above. Thus, even when the contact width δ is increased, the contact pressure at the distal end 35 on the deflector 52 is not reduced, and a difference between the contact pressure at the distal end 35 and the contact pressure on a root side does not become so small that the distal end 35 of the side lip 23 floats away from the sliding surface 53 of the deflector 52.

Specifically, as illustrated in FIG. 5, even when a considerable looseness occurs in the axle 51, and the contact width δ is increased and becomes a contact width δ1 in which the side lip 23 contacts the sliding surface 53 of the deflector 52 at also the inner peripheral surface 32a of the middle portion 32 beyond the inner peripheral surface 31a of the distal end portion 31 toward the root side, the distal end 35 can be prevented from floating away from the sliding surface 53 of the deflector 52. Even in a state of the large contact width δ1 as illustrated in FIG. 5, the contact pressure at the distal end portion 31 of the side lip 23 is larger than the contact pressure at the middle portion 32 of the side lip 23.

The grooves 34 are formed in the middle portion 32 of the side lip 23 and hence the side lip 23 readily bends at the middle portion 32 to the outer periphery side. As a result, when the side lip 23 is in a state of the large contact width as illustrated in FIG. 5, a reaction force produced by the bent middle portion 32 is low and a pressure of the side lip 23 on the deflector 52 is lower than that of a side lip having no grooves 34. Thus, the sealing device is able to reduce the pressing force of the side lip 23 as compared with conventional sealing devices, reduce a sliding resistance generated by the contact of the side lip 23 with the deflector 52, and reduce sliding torque exerted by the side lip 23 on the axle 51. On the other hand, this configuration, as described above, can maintain the contact pressure at the distal end portion 31 of the side lip 23 to be larger than the contact pressure at the middle portion 32 of the side lip 23 and prevent the distal end 35 of the side lip 23 from floating away from the sliding surface 53 of the deflector 52.

In this way, the sealing device 1 according to the first embodiment of the present invention is capable of reducing sliding torque caused by the side lip 23.

Figure 6:
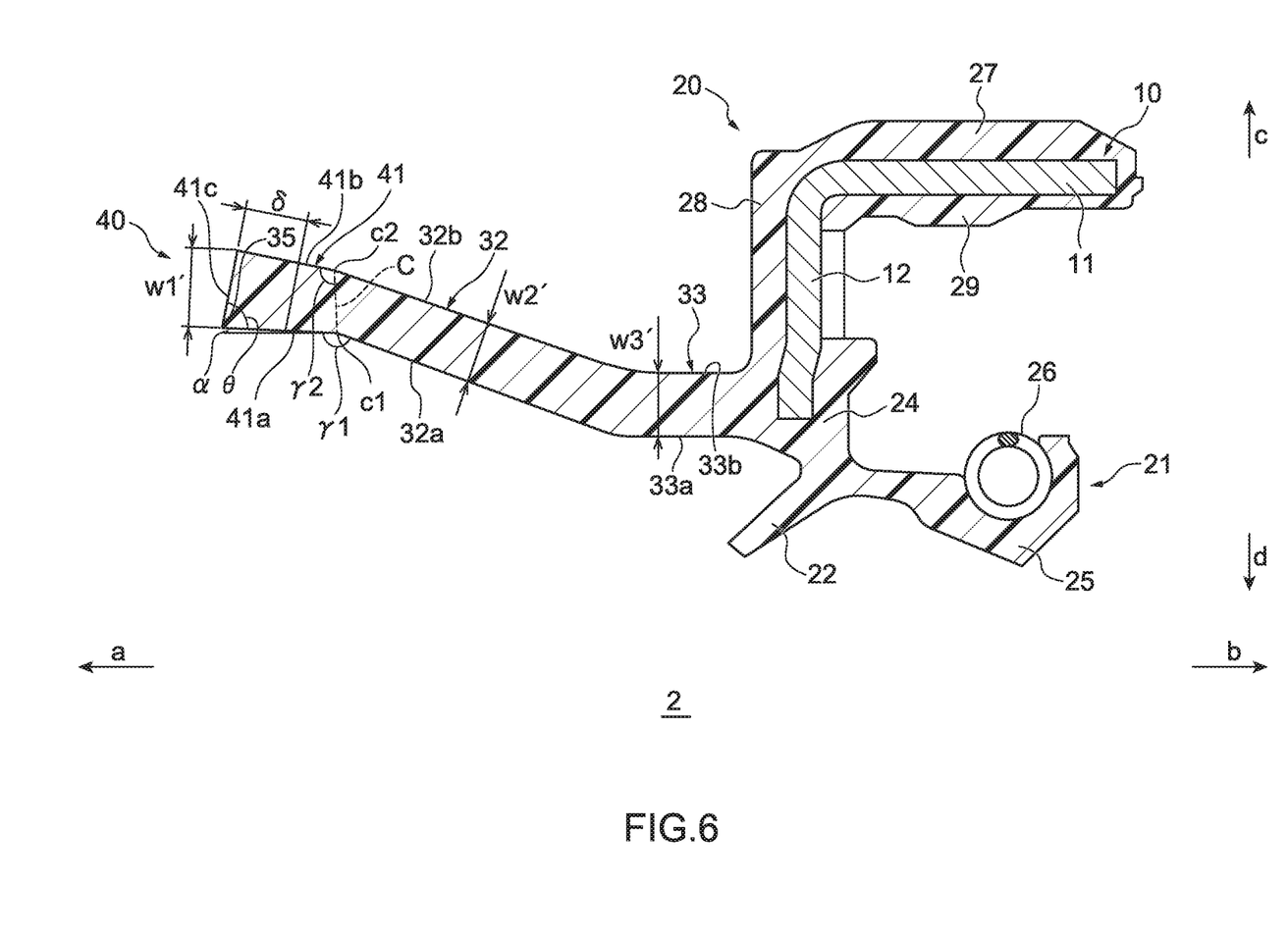

Next, a sealing device 2 according to a second embodiment of the present invention will be described. FIG. 6 is a partial enlarged cross-sectional view taken along the axis x for illustrating a schematic configuration of the sealing device 2 according to the second embodiment of the present invention. The sealing device 2 according to the second embodiment of the present invention differs in side lip structure from the sealing device 1 described above according to the first embodiment of the present invention. Hereinafter, components of the sealing device 2 according to the second embodiment of the present invention that are identical or similar in function to those of the sealing device 1 according to the first embodiment of the present invention are assigned the same reference signs, and descriptions thereof are omitted. Parts that differ between the sealing devices will be described.

In the sealing device 2, as illustrated in FIG. 6, a side lip 40, which is different from the side lip 23 of the sealing device 1, has no groove 34 and has a distal end portion 41 that differs in shape from the distal end portion 31. The distal end portion 41 is formed so as to decrease in thickness as progress toward a middle portion 32 side. Specifically, an inner peripheral surface 41a and an outer peripheral surface 41b of the distal end portion 41 are not parallel to each other. The inner peripheral surface 41a and the outer peripheral surface 41b are inclined with respect to each other such that a distance between the inner peripheral surface 41a and the outer peripheral surface 41b decreases as progress from a distal end 35 toward the middle portion 32 side. Thus, a thickness of the distal end portion 41 at a connection zone C is smaller than a thickness w1' of the distal end portion 41 at the distal end 35. The thickness w1' is, for example, equal to the thickness w1 of the distal end portion 31 of the side lip 23 of the sealing device 1. In the sealing device 2, a thickness w2' of the middle portion 32 and a thickness w3' of a root portion 33 are thinner than the thickness w2 of the middle portion 32 and the thickness w3 of the root portion 33 respectively of the sealing device 1. An angle (a distal end angle θ) formed by the distal end 35 of the distal end portion 41 is acute. As illustrated in FIG. 6, the distal end angle θ is an angle between an outer side surface 41c, a surface of the distal end portion 41 on the outer side, and the inner peripheral surface 41a on a cross section along the axis x.

Specifically, as illustrated in FIG. 6, an angle (a bend angle γ1) between the inner peripheral surface 41a of the distal end portion 41 and an inner peripheral surface 32a of the middle portion 32 is smaller than a (rear-side) angle (a bend angle γ2) between the outer peripheral surface 41b of the distal end portion 41 and an outer peripheral surface 32b of the middle portion 32. In other words, in the sealing device 2, the inner peripheral surface 41a of the distal end portion 41 of the side lip 40 is inclined more toward the inner periphery side than the inner peripheral surface 31a of the distal end portion 31 of the side lip 23 of the sealing device 1 described above is. In the sealing device 2, the inner peripheral surface 41a of the distal end portion 41 may not be inclined more toward the inner periphery side than the inner peripheral surface 31a of the distal end portion 31 of the sealing device 1 is. In this case, in the sealing device 2, the outer peripheral surface 41b of the distal end portion 41 is inclined more toward the outer periphery side than the outer peripheral surface 31b of the distal end portion 31 of the sealing device 1 is. In FIG. 6, the thickness of the distal end portion 41 is a width in a direction orthogonal to the inner peripheral surface 41a. However, the thickness of the distal end portion 41 may be a width in a direction orthogonal to the outer peripheral surface 41b, or may be a thickness defined by another method.

The inner peripheral surface 41a of the distal end portion 41 is a conical or substantially conical surface centered or substantially centered about the axis x. The inner peripheral surface 41a may be a curved surface of other forms, such as a curved surface having a cross-sectional outline that is curved so as to be recessed to the outer periphery side, a curved surface having a cross-sectional outline that is curved so as to project to the inner periphery side, or a curved surface that combines these outlines. Similarly, the outer peripheral surface 41b of the distal end portion 41 is a conical or substantially conical surface centered or substantially centered about the axis x. The outer peripheral surface 41b may be a curved surface of other forms, such as a curved surface having a cross-sectional outline that is curved so as to be recessed to the inner periphery side, a curved surface having a cross-sectional outline that is curved so as to project to the outer periphery side, or a curved surface that combines these outlines.

The sealing device 2 can produce effects owing to a bend between the distal end portion 41 and the middle portion 32 of the side lip 40 in a similar way that the sealing device 1 does as described above owing to a bend between the distal end portion 31 and the middle portion 32 of the side lip 23. In the side lip 40, the distal end portion 41 decreases in thickness as progress toward a root side (from the outer side to the inner side). The middle portion 32 and the root portion 33 are made thinner, resulting in a reduction in rigidity of both the middle portion 32 and the root portion 33. This allows the side lip 40 in the usage state to reduce a pressing force put on a deflector 52 or a reaction force put by the deflector 52 through a zone of contact of the distal end portion 41 with the deflector 52. Thus, the sealing device is able to reduce a sliding resistance generated by the contact of the side lip 40 with the deflector 52 and reduce sliding torque exerted by the side lip 40 on an axle 51. On the other hand, the distal end angle θ formed by the distal end 35 of the distal end portion 41 of the side lip 40 is acute. This configuration provides a decrease in the width of contact of the distal end portion 41 with the deflector 52 and thus can inhibit or prevent a reduced pressing force on the deflector 52 or a reduced reaction force put by the deflector 52 from causing a reduction in contact pressure at the distal end 35.

This can improve sealing performance at the distal end 35 of the side lip 40 and can improve performance in preventing the entry of foreign matter. In other words, this can inhibit or prevent a reduction in sealing performance at the distal end 35 of the side lip 40 and can inhibit or prevent a reduction in performance in preventing the entry of foreign matter.

In this way, the sealing device 2 according to the second embodiment of the present invention is capable of reducing sliding torque caused by the side lip 40.

Figure 7:
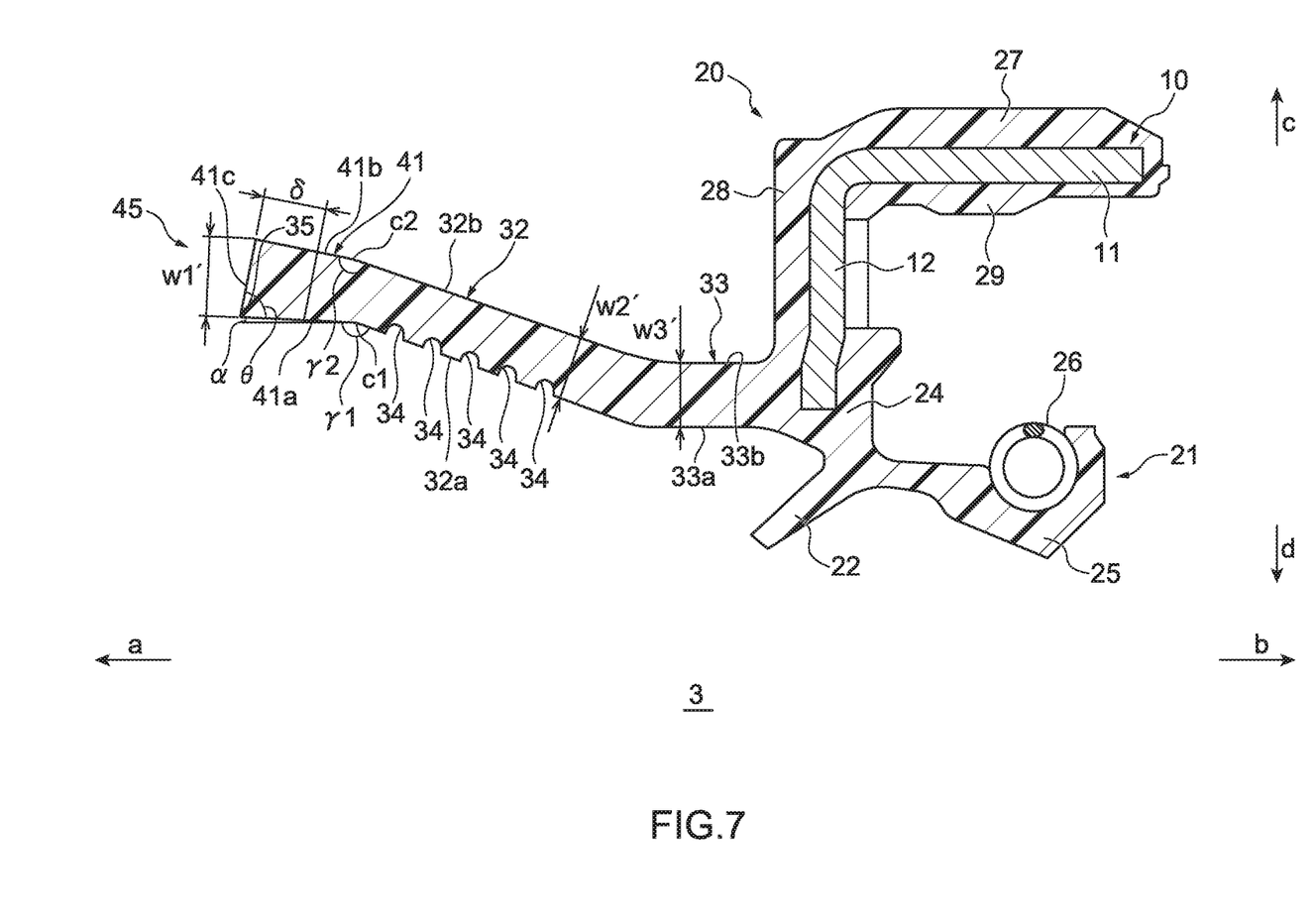

Next, a sealing device 3 according to a third embodiment of the present invention will be described. FIG. 7 is a partial enlarged cross-sectional view taken along the axis x for illustrating a schematic configuration of the sealing device 3 according to the third embodiment of the present invention. The sealing device 3 according to the third embodiment of the present invention differs in side lip structure from the sealing device 1 described above according to the first embodiment of the present invention. Hereinafter, components of the sealing device 3 according to the third embodiment of the present invention that are identical or similar in function to those of the sealing device 1 according to the first embodiment of the present invention are assigned the same reference signs, and descriptions thereof are omitted. Parts that differ between the sealing devices will be described.

In the sealing device 3, as illustrated in FIG. 7, a side lip 45, which is different from the side lip 23 of the sealing device 1, has a distal end portion 41 of a sealing device 2 as described above that differs from the distal end portion 31. The distal end portion 41 is, as described above, formed so as to decrease in thickness as progress toward a middle portion 32 side.

The sealing device 3 can produce effects in a similar way that the sealing device 1 and the sealing device 2 do as described above. Specifically, in the side lip 45 of the sealing device 3, the middle portion 32 has grooves 34, and the distal end portion 41 is bent to the inner periphery side with respect to the middle portion 32 and is formed so as to decrease in thickness as progress toward the middle portion 32 side. This configuration provides an increase in contact pressure at the distal end portion 41 while enabling the side lip 45 to be readily bent at the middle portion 32. In other words, this configuration can inhibit or prevent a reduction in contact pressure at the distal end portion 41 while enabling the side lip 45 to be readily bent at the middle portion 32. As a result, even when the side lip 45 contacts a sliding surface 53 of a deflector 52 at also the middle portion 32, the sealing device is able to prevent a distal end 35 of the side lip 45 from floating away from the sliding surface 53 of the deflector 52 and reduce sliding torque exerted by the side lip 45 on an axle 51.

In this way, the sealing device 3 according to the third embodiment of the present invention is capable of reducing sliding torque caused by the side lip 45.

Although the embodiments of the present invention have been described above, the present invention is not limited to the sealing devices 1 to 3 according to the embodiments of the present invention, and includes any modes falling within the scope of the concept and claims of the present invention. Respective configurations may be appropriately selectively combined to solve at least part of the above-described problems and achieve at least part of the above-described effects. For example, in the above-described embodiments, the shape, material, arrangement, size and the like of each component can be appropriately changed according to a specific use mode of the present invention.

Figure 8:
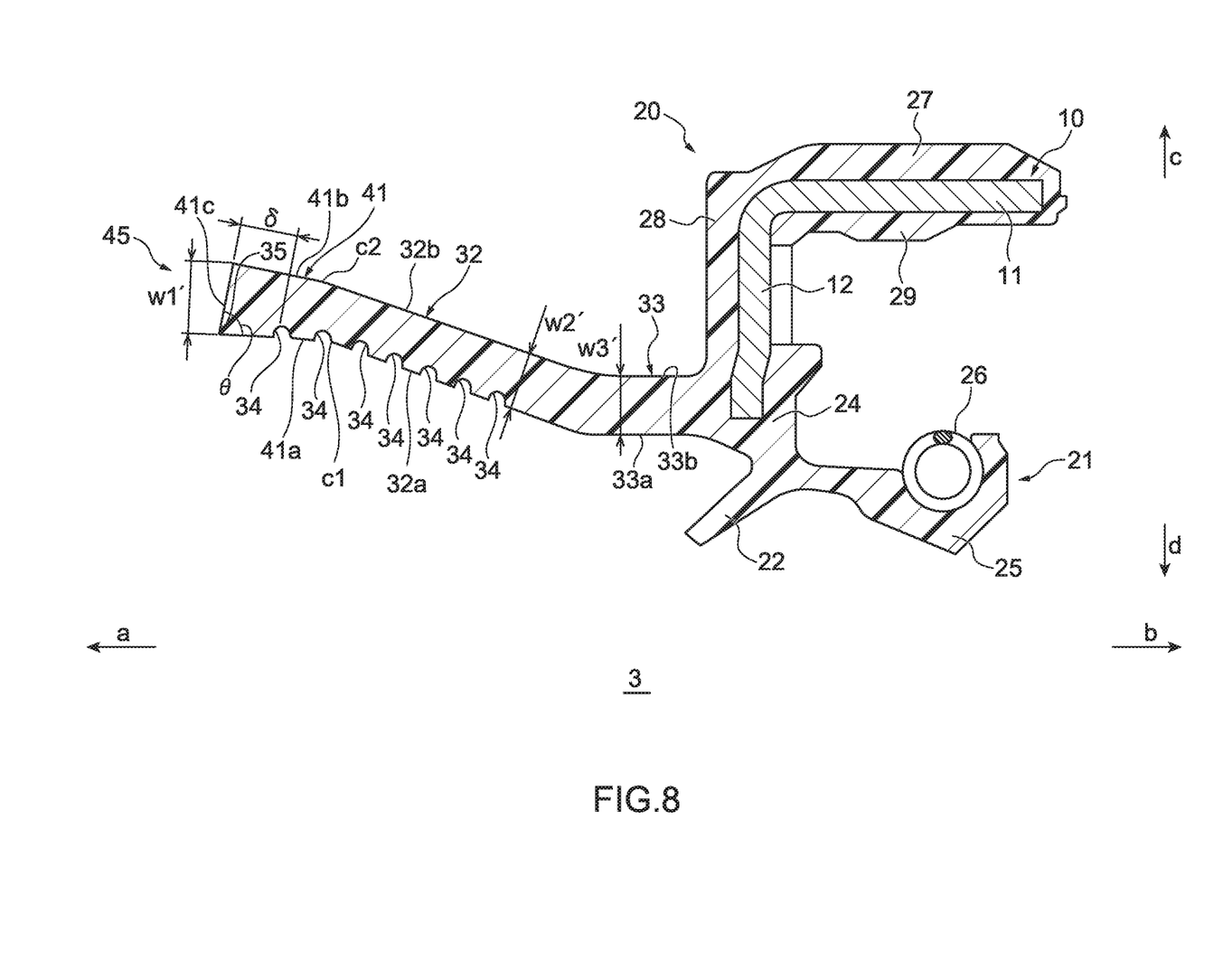

In the sealing devices 1 and 3 according to the first and the third embodiments of the present invention described above, the grooves 34 are provided only in the middle portions 32 of the side lips 23 and 45. However, one or a plurality of grooves 34 may also be provided in each of the distal end portions 31 and 41. For example, in the sealing device 3, as illustrated in FIG. 8, a groove 34 may be formed in the inner peripheral surface 41a of the distal end portion 41. Similarly, in the sealing device 1, a groove 34 may be formed in the inner peripheral surface 31a of the distal end portion 31. A cross-sectional shape of the groove 34 formed in each of the distal end portions 31 and 41 may not be the same as the cross-sectional shape of the grooves 34 formed in the middle portion 32. If grooves 34 are formed in the distal end portions 31 and 41 respectively, the distal end portions 31 and 41 can produce the effect of reducing sliding torque caused by the respective side lips 23 and 45 in a similar way to the middle portions 32. The grooves 34 in the distal end portions 31 and 41 can hold applied grease and maintain lubrication effect of the applied grease for an increased length of time.

LIST OF REFERENCE SIGNS 1, 2, 3, 100 sealing device,
10, 101 reinforcing ring,
11 cylindrical part,
12 disc,
20, 102 elastic body part,
21, 103 seal lip,
22, 104 dust lip,
22a projection,
23, 40, 45, 105 side lip,
24 lip waist portion,
25 lip distal end portion,
25a taper surface,
25b screw projection,
26 garter spring,
27 gasket part,
28 rear cover part,
29 lining part,
31, 41 distal end portion,
31a, 41a inner peripheral surface,
31b, 41b outer peripheral surface,
32 middle portion,
32a inner peripheral surface,
32b outer peripheral surface,
33 root portion,
33a inner peripheral surface,
33b outer peripheral surface,
34 groove,
35 distal end,
41c outer side surface,
50 transaxle,
51, 111 axle,
51a outer peripheral surface,
52, 113 deflector,
53, 113a sliding surface,
54, 112 housing,
55, 114 through-hole,
55a inner peripheral surface,
110 differential mechanism,
C connection zone,
c1 inner peripheral connection portion,
c2 outer peripheral connection portion,
w1, w1', w2, w3 thickness,
θ distal end angle, δ, δ1, δ2 contact width,
γ1, γ2 bend angle

The invention claimed is:

1. A sealing device for sealing between a through-hole and a shaft inserted through the through-hole, the sealing device comprising:
a reinforcing ring formed annularly around an axis; and
an elastic body part formed from an elastic body that is attached to the reinforcing ring and that is formed annularly around the axis, the elastic body part including:
an annular seal lip, the seal lip being in contact with the shaft such that the shaft is slidable;
an annular dust lip, the dust lip being provided on an outer side of the seal lip and extending toward the axis; and
an annular side lip, the side lip extending toward the outer side on an outer periphery side of the dust lip, the side lip including:
an annular middle portion, the middle portion increasing in diameter as progress toward the outer side in a direction of the axis; and
an annular distal end portion, the distal end portion being a portion connected to and on an outer side of the middle portion, the distal end portion increasing in diameter as progress toward the outer side in the direction of the axis,
wherein in the side lip, the distal end portion is bent to an inner periphery side from the middle portion, and
wherein in the middle portion, at least one groove is formed annularly around the axis,
wherein the distal end portion of the side lip includes an outer side surface, which is an outermost surface of the distal end portion, and an inner peripheral surface and an outer peripheral surface, each of which extends from the outer side surface to the middle portion,
the outer side surface of the distal end portion is flat between the inner peripheral surface and the outer peripheral surface, and
a thickness of the distal end portion between the inner peripheral surface and the outer peripheral surface decreases as progress from the outer side surface toward the middle portion.

2. The sealing device according to claim 1, wherein the groove is formed in an inner peripheral surface of the middle portion.

3. The sealing device according to claim 1, wherein a cross section of the groove along the axis has an outline of an arc having a fixed curvature.

4. The sealing device according to claim 1, wherein the groove is not formed in a connection zone between the distal end portion and the middle portion.

5. The sealing device according to claim 1, wherein a plurality of the grooves are formed, and a space between the grooves adjacent to each other is constant.

6. A sealing device for sealing between a through-hole and a shaft inserted through the through-hole, the sealing device comprising:
a reinforcing ring formed annularly around an axis; and
an elastic body part formed from an elastic body that is attached to the reinforcing ring and that is formed annularly around the axis, the elastic body part including:
an annular seal lip, the seal lip being in contact with the shaft such that the shaft is slidable;
an annular dust lip, the dust lip being provided on an outer side of the seal lip and extending toward the axis; and
an annular side lip, the side lip extending toward the outer side on an outer periphery side of the dust lip, the side lip including:
an annular middle portion, the middle portion increasing in diameter as progress toward the outer side in a direction of the axis; and
an annular distal end portion, the distal end portion being a portion connected to and on an outer side of the middle portion, the distal end portion increasing in diameter as progress toward the outer side in the direction of the axis,
wherein in the side lip, the distal end portion is bent to an inner periphery side from the middle portion, and
wherein the distal end portion of the side lip includes an outer side surface, which is an outermost surface of the distal end portion, and an inner peripheral surface and an outer peripheral surface, each of which extends from the outer side surface to the middle portion,
the outer side surface of the distal end portion is flat between the inner peripheral surface and the outer peripheral surface, and
a thickness of the distal end portion between the inner peripheral surface and the outer peripheral surface decreases as progress from the outer side surface toward the middle portion.

7. The sealing device according to claim 1, wherein the middle portion is formed so as to have a fixed thickness.

8. The sealing device according to claim 1, wherein the distal end portion has a conical cylindrical shape centered about the axis, and the middle portion has a conical cylindrical shape centered about the axis.

9. The sealing device according to claim 1, wherein the side lip has a root portion formed annularly around the axis, and the middle portion is a portion that is connected to the root portion and that is on the outer side of the root portion.

10. The sealing device according to claim 1, wherein the outer side surface and the inner peripheral surface of the distal end portion are connected to each other to form a sharp corner, and a distal end angle formed by the outer side surface and the inner peripheral surface is acute.

11. The sealing device according to claim 6, wherein the outer side surface and the inner peripheral surface of the distal end portion are connected to each other to form a sharp corner, and a distal end angle formed by the outer side surface and the inner peripheral surface is acute.

* * * * *